United States Patent
Kim et al.

(10) Patent No.: US 8,467,830 B2
(45) Date of Patent: Jun. 18, 2013

(54) MOBILE TERMINAL AND METHOD OF PROVIDING BROADCASTS THERETO

(75) Inventors: Seong Nam Kim, Suwon-si (KR); Ji Soo Bae, Gwangmyeong-si (KR); Sung Oh Cho, Sacheon-si (KR); Beom Seok Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 738 days.

(21) Appl. No.: 11/966,848

(22) Filed: Dec. 28, 2007

(65) Prior Publication Data
US 2009/0005118 A1   Jan. 1, 2009

(30) Foreign Application Priority Data
Jun. 29, 2007   (KR) .................. 10-2007-0065087

(51) Int. Cl.
*H04B 1/38*   (2006.01)
(52) U.S. Cl.
USPC .............. 455/558; 455/566; 725/31; 725/40; 725/98
(58) Field of Classification Search
USPC ....................................................... 455/558
See application file for complete search history.

(56) References Cited

U.S. PATENT DOCUMENTS

| | | | | |
|---|---|---|---|---|
| 5,650,827 A | * | 7/1997 | Tsumori et al. | 725/59 |
| 7,134,131 B1 | * | 11/2006 | Hendricks et al. | 725/31 |
| 7,398,541 B2 | * | 7/2008 | Bennington et al. | 725/40 |
| 2003/0037338 A1 | * | 2/2003 | Suzuki | 725/98 |
| 2005/0117566 A1 | * | 6/2005 | Davidson | 370/352 |
| 2005/0215259 A1 | * | 9/2005 | Cheng | 455/452.2 |
| 2007/0199024 A1 | * | 8/2007 | Noh et al. | 725/46 |
| 2008/0009324 A1 | * | 1/2008 | Patel | 455/566 |

FOREIGN PATENT DOCUMENTS
WO   WO 2006/067871 A1   6/2006

* cited by examiner

*Primary Examiner* — Ajibola Akinyemi
(74) *Attorney, Agent, or Firm* — Birch, Stewart, Kolasch & Birch, LLP

(57) ABSTRACT

A terminal, a computer program product and a method of providing broadcasts thereto by which a single SIM card can receive broadcasts provided by a plurality of broadcast providers in a manner of deactivating a function of receiving broadcasts provided by a first broadcast provider. A function of only receiving a broadcast provided by a first broadcast provider is deactivated, broadcasts of a plurality of broadcast providers in a current area are searched, and information for the searched broadcasts are displayed.

20 Claims, 13 Drawing Sheets

MOBILE TERMINAL AND METHOD OF PROVIDING BROADCASTS THERETO

CROSS REFERENCE TO RELATED APPLICATIONS

This application claims the benefit of the Korean Patent Application No. 10-2007-0065087, filed on Jun. 29, 2007, which is hereby incorporated by reference as if fully set forth herein.

BACKGROUND OF THE INVENTION

1. Field of the Invention

The present invention relates to a terminal, and more particularly, to a terminal and a method of providing broadcasts thereto.

2. Discussion of the Related Art

Recently, a subscriber identity module (hereinafter abbreviated SIM) card for receiving a broadcast of each broadcast provider is very popular for sale in Europe.

The broadcast provider basically provides mobile communication services including phone call, message, video communication and the like, purchases broadcast contents from other broadcast contents providers to provide the purchased contents to its users, and sets the SIM card to receive the purchased broadcast contents only.

When corresponding user buys the SIM card, only a broadcast of the corresponding broadcast provider matching the SIM card is receivable.

Once the SIM card is inserted in a terminal, the terminal is only able to receive a broadcast provided by the broadcast provider corresponding to the SIM card. The terminal is unable to receive broadcasts provided by other broadcast providers in the same area where the corresponding terminal is located.

So, to receive broadcasts provided by a broadcast provider-B, a user having purchased a SIM card capable of receiving broadcasts provided by broadcast provider-A has to purchase another SIM card sold by the broadcast provider-B.

SUMMARY OF THE INVENTION

Accordingly, the present invention is directed to a computer program product, a terminal and a method of providing broadcasts thereto that substantially obviate one or more problems due to limitations and disadvantages of the related art.

An object of the present invention is to provide a computer program product, a terminal and a method of providing broadcasts thereto, by which a single SIM card can receive broadcasts provided by a plurality of broadcast providers by deactivating a function of receiving broadcasts provided by a first broadcast provider.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a terminal according to the present invention includes a user input unit, a communication unit configured to receive broadcasts, a control unit configured to deactivate a function of receiving the broadcast provided by a first broadcast provider only in response to the user input unit and to search the broadcasts of a plurality of broadcast providers in a current area, a display module configured to display a search result.

Preferably, the function is deactivated or activated according to the key signal inputted from the user input unit.

Preferably, the control unit searches broadcast frequencies of the entire broadcast providers existing in the current area.

Preferably, the control unit searches broadcast frequencies of n broadcast providers selected by a user from an entire list of broadcast providers existing in the current area.

Preferably, the information for the broadcasts includes either names of the broadcast providers or names of pay/free broadcast channels provided by the broadcast providers.

Preferably, if a plurality of information are displayed, the control unit displays the information to be discriminated from each other according to at least one of priority, broadcast frequency and broadcast content/type/provider/etc.

Preferably, the control unit receives broadcast program information for the broadcast providers via broadcast frequencies of the searched broadcast providers, extracts pay/free broadcast channels of the broadcast providers from the received broadcast program information, and displays the extracted pay/free broadcast channels on the display module.

More preferably, if one of the pay broadcast channels is selected, the control unit is connected to an external service network for selling the selected pay broadcast channel via the communication unit.

More preferably, the control unit displays the pay/free broadcast channels with reference to a difference between a measured reception sensitivity and a reference value of each of the extracted pay/free broadcast channels.

Preferably, if the displayed information is selected, the control unit plays the broadcast corresponding to the selected information.

In another aspect of the present invention, a computer program product and a corresponding method of providing broadcasts to a terminal includes the steps of deactivating a function of receiving a broadcast provided by a first broadcast provider only, searching broadcasts provided by a plurality of broadcast providers in a current area, and displaying the searched result.

In another aspect of the present invention, a terminal includes a user input unit, a communication unit configured to search broadcast frequencies of a plurality of broadcast providers in a current area if a function of receiving a broadcasting provided by a first broadcast provider only is deactivated, the communication unit configured to receive broadcast program informations for the broadcast providers via the searched broadcast frequencies, a control unit configured to extract informations for one of a pay and a free broadcast channels provided by the broadcast providers from the broadcast program informations received by the communication unit, a display module configured to display the informations extracted by the control unit.

In another aspect of the present invention, a computer program product and a corresponding method of providing broadcasts to a terminal includes the steps of deactivating a function of receiving a broadcasting provided by a first broadcast provider only, searching broadcast frequencies of a plurality of broadcast providers in a current area, receiving broadcast program informations for the broadcast providers via the searched broadcast frequencies, extracting informations for one of a pay and a free broadcast channels provided by the broadcast providers from the broadcast program informations; and displaying the extracted informations.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is applicable to various kinds of terminals including a mobile phone, a smart phone, a broadcast receiving terminal, a PDA (personal digital assistants), a PMP (portable multimedia player), a navigation system and the like. In the following description, for clarity, the present invention is applied to a mobile communication terminal for example, which does not restrict the scope of the appended claims and their equivalents.

A terminal according to the present invention is explained with reference to the accompanying drawings.

First of all, a terminal according to the present invention is described in aspect of elements according to functions.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
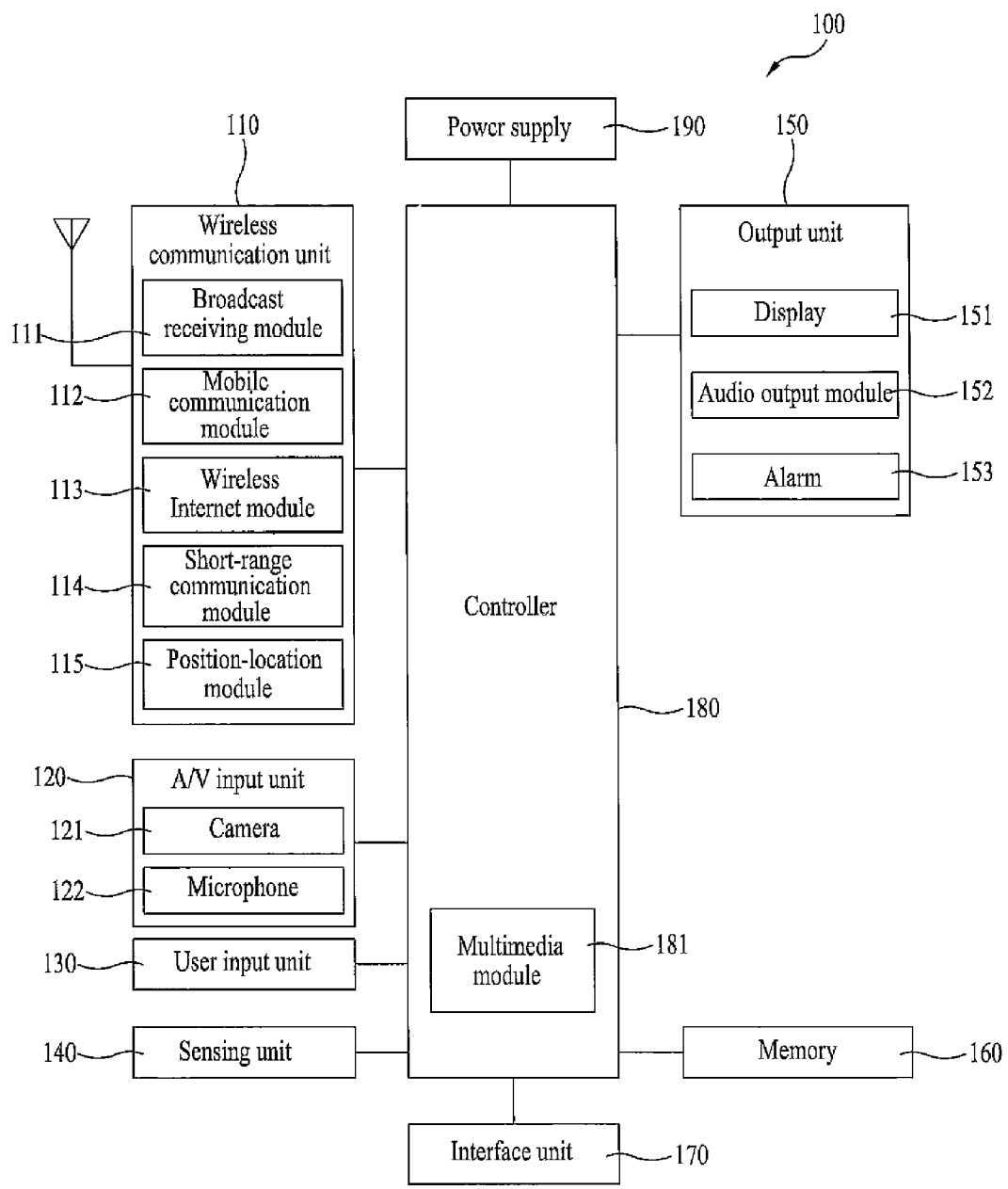
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. In one embodiment, the wireless communication unit 110 includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward lick only (MediaFLO®) and integrated services digital broadcast-terrestrial (ISDB-T). Receipt of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The interface unit 170 acts as an interface with all external devices connected to the terminal 100, for instance, the interface unit 170 includes a wire/wireless headset, an external charger, a wire/wireless data port, a card socket (e.g., a memory card socket, SIM/UIM card socket), audio I/O (input/output) port, video I/O (input/output) port, an earphone port, USB universal serial bus) connecting port, and the like.

If a SIM card is loaded, the interface unit 170 enables the control unit 180 to read data stored in the SIM card and accomplish user authentication.

The output unit 150 generally includes various components which support the output requirements of the mobile terminal. Display 151 is implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. In this case, broadcast program information such as EPG, ESG and the like can be included in the broadcast signal stored in the memory 160.

The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
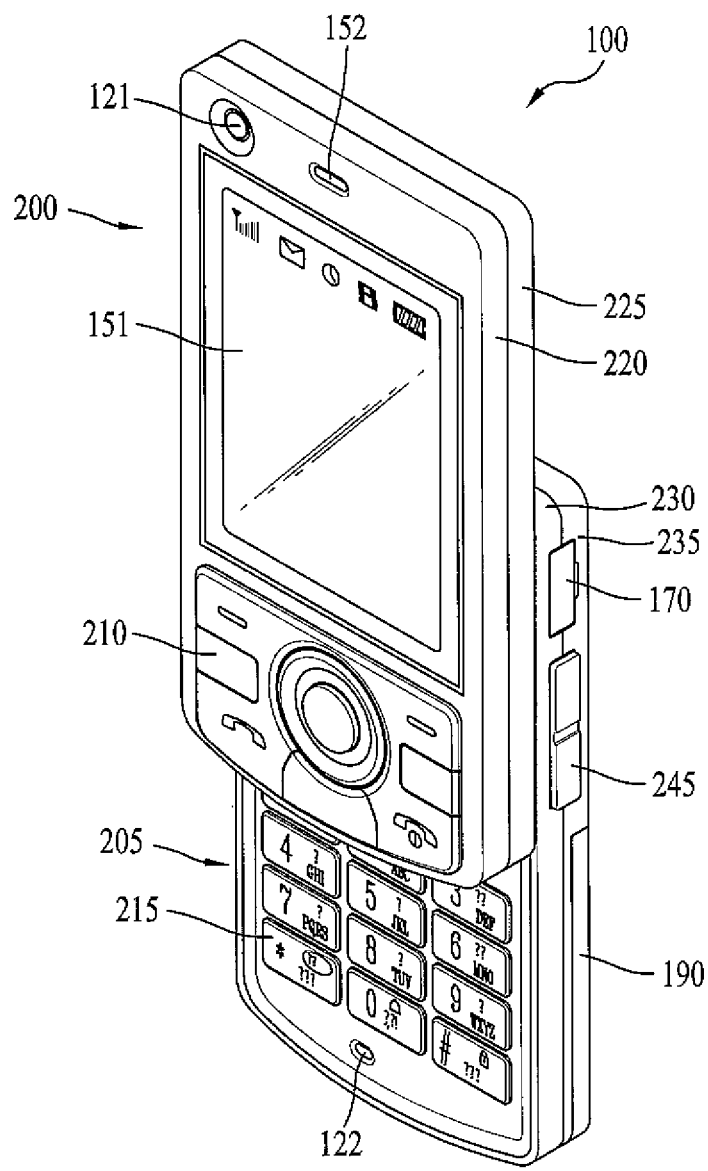
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
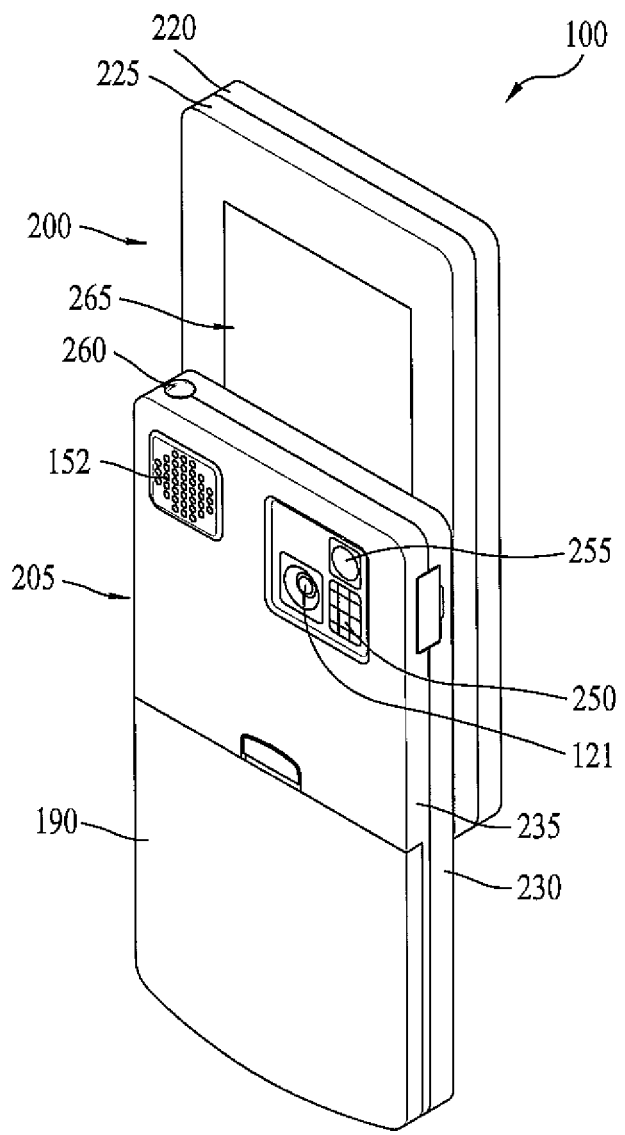
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to mainly embodiments, and as such, the components may be positioned at locations which differ from those shown by the representative figures. The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
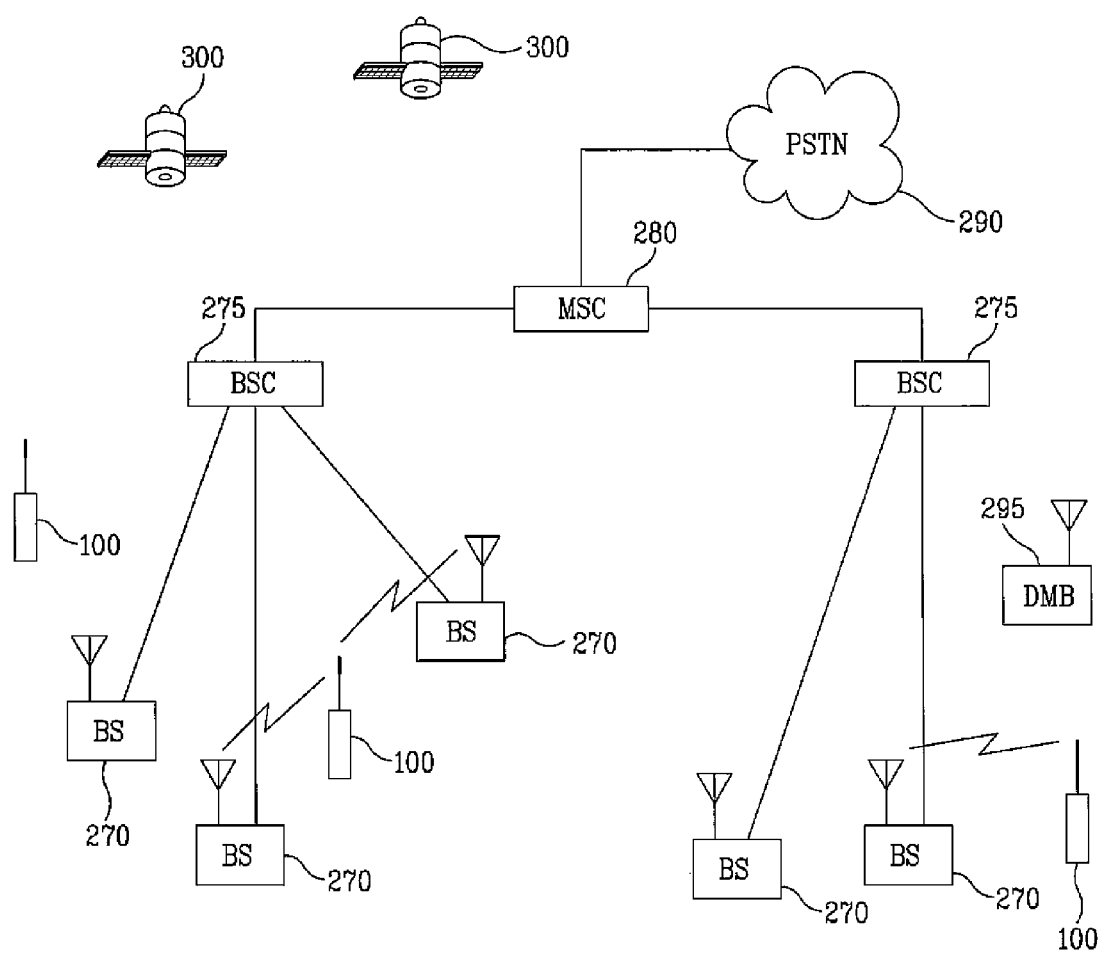
FIG. 4 is a block diagram of a CDMA wireless communication system operable with the mobile terminal of FIGS. 1-3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

So far, a terminal according to the present invention is described in aspect of elements according to functions. From now on, a broadcast providing method that can be implemented in the above-configured terminal is explained for each embodiment of the present invention. Of course, the following embodiments can be realized individually or by being mutually combined.

For clarity of the description of the present invention, broadcasting implemented in the present invention primarily relates to DVB-H broadcasting for example, which does not restrict the scope of the appended claims and their equivalents. Hence, it is understood that the present invention is not restricted by the following description and implementations.

In the present invention, a broadcast provider can include a server that generates and transmits a broadcast signal and/or broadcast contents for broadcast associated information and the like or another server that basically provides a mobile communication service such as voice communication, message, video communication and the like and also transmits previously generated broadcast contents to a terminal.

Prior to the description of the present invention, terminologies for two functions are defined as follows.

First of all, a default broadcast viewing function is defined as receiving a broadcast provided by a first broadcast provider only. Secondly, a free broadcast viewing function is defined as receiving broadcasts of all broadcast providers serviced in a current area in a manner of deactivating the function of receiving the broadcast provided by the first broadcast provider only.

A method of providing a broadcast to a terminal according to the present invention is explained in detail with reference to FIG. 5 as follows.

Figure 5:
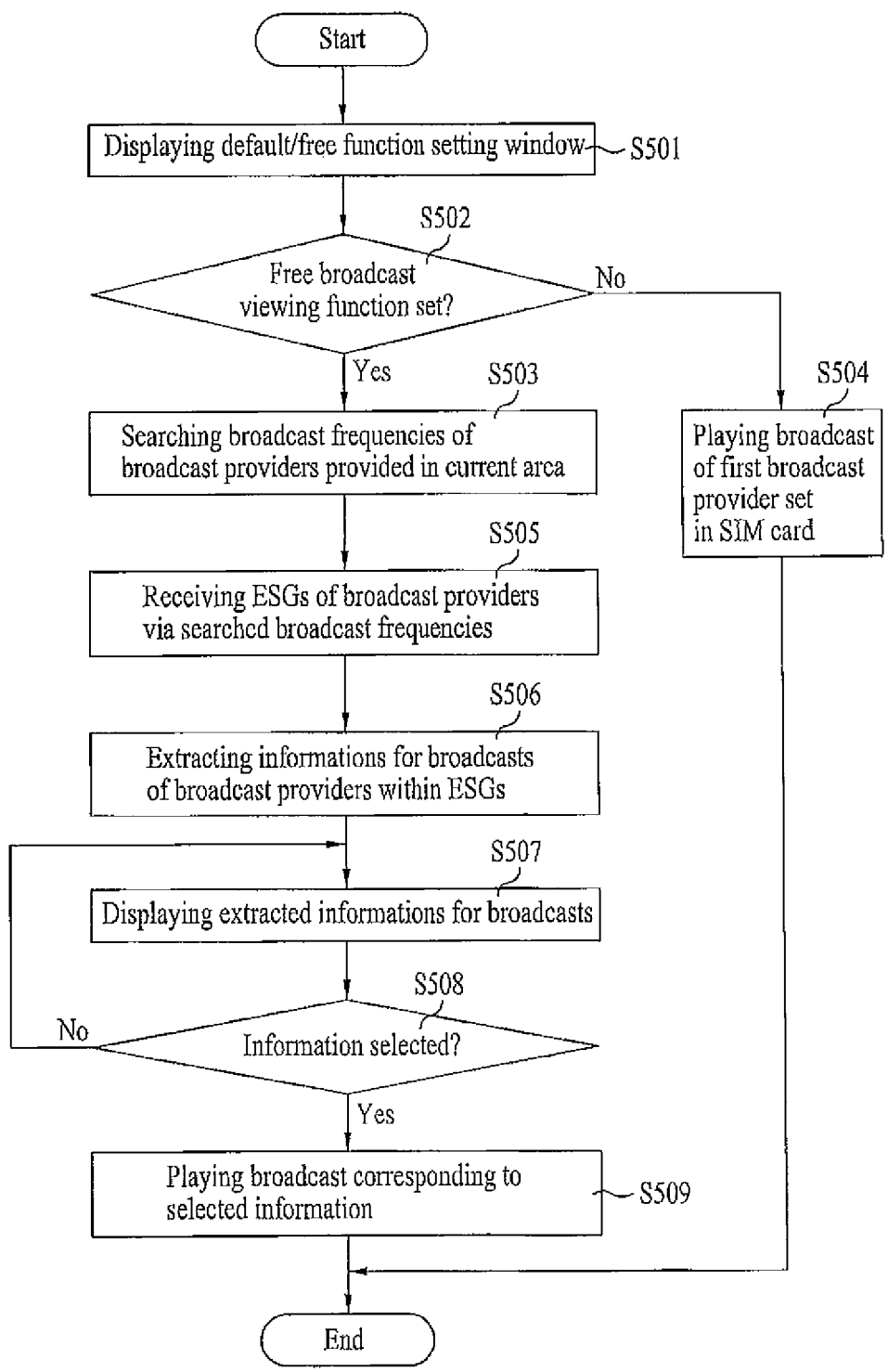
FIG. 5 is a flowchart of a method of providing a broadcast to a terminal according to one embodiment of the present invention.

FIG. 5 is a flowchart of a method of providing a broadcast to a terminal according to one embodiment of the present invention.

Referring to FIG. 5, the control unit 180 of the terminal 100 displays a setting window for setting the default or free broadcast viewing function on the display module 151 while a SIM card, for which the default broadcast viewing function for receiving a broadcast provided by a first broadcast provider is set, is inserted in the interface 170 (S501).

If the free broadcast viewing function is set via the displayed setting window (S502), the control unit 180 controls the broadcast receiving module 111 to search broadcast frequencies of broadcast providers in a current area (S503).

If the default broadcast viewing function is set via the setting window, the control unit 180 receives a broadcast signal provided by the first broadcast provider set in the SIM card only (S504).

In this case, the control unit 180 is able to set the default or free broadcast viewing function according to an input of a preset shortcut key or a preset default function key as well as the setting window.

The default broadcast viewing function or the free broadcast viewing function can be set on a main menu of the terminal 100 or a broadcast menu.

If the default broadcast viewing function or the free broadcast viewing function is set via the user input unit 130, the control unit 180 is able to display an icon for indicating a mode of the default broadcast viewing function or the free broadcast viewing function on a portion of a broadcast screen of the display module 151.

In this case, if the display module 151 is a touchscreen type, the control unit 180 is able to change a display position of the icon indicating the default broadcast viewing function mode or the free broadcast viewing function mode according to a touch made by a user or fix the icon to the changed position.

If the default broadcast viewing function or the free broadcast viewing function is set, the control unit 180 controls the audio output module 152 to output a vibration sound or audio indicating the default broadcast viewing function mode or the free broadcast viewing function mode to enable the user to quickly recognize whether it is currently the default broadcast viewing function mode or the free broadcast viewing function mode.

In the step S503, the control unit 180 is able to search the broadcast frequencies of the entire broadcast providers existing in the area where the terminal 100 is currently located or broadcast frequencies of n broadcast providers selected via the user input unit 130 from the entire broadcast providers.

While performing the search operation in the step S503, the control unit 180 is able to display information, which indicates that the search is being carried out, on the broadcast screen of the display module 151.

In this case, the information indicating that the search is being carried out includes at least one of text, character image, animation and icon or any combination of two thereof.

The control unit 180 receives electronic service guide (ESGs) of the broadcast providers via the broadcast frequencies searched in the step S503 (S505).

The control unit 180 extracts information associated with broadcasts provided by the broadcast providers from the received ESGs (S506).

The control unit 180 displays the extracted information on the broadcast screen of the display module 151 (S507).

In this case, the information associated with the broadcasts can include names of the broadcast providers and names of pay/free broadcast channels provided by the broadcast providers.

The control unit 180 extracts the names of the broadcast providers from the received ESGs and then displays the extracted names on the broadcast screen of the display module 151.

The control unit extracts the names of the pay/free broadcast channels provided by the broadcast providers from the ESGs and then displays the extracted names on the broadcast screen of the display module 151.

The control unit 180 extracts the names of the pay broadcast channels from the ESGs and then displays the extracted names only.

The control unit 180 extracts the names of the free broadcast channels from the ESGs and then displays the extracted names only.

The control unit extracts the names of the pay and free broadcast channels provided by the broadcast providers from the ESGs, sorts the extracted names of the pay and free broadcast channels for each of the broadcast providers, and then displays the sorted names.

In this case, the information associated with the corresponding broadcast can include at least one of text, character image, animation and icon or any combination of two thereof.

After completion of the search operation, the control unit 180 displays the information associated with the searched broadcast frequencies on the broadcast screen of the display module 151.

Each time the corresponding frequency is searched after initiation of the search operation, the control unit 180 is able to sequentially display the information associated with the searched broadcast frequencies on the display screen of the display module 151.

In this case, the information associated with the broadcast frequencies can be displayed in a manner of being sequentially updated to a broadcast skin of the display module 151 or can be displayed as one of a list style, a grid style or a rotation style.

The control unit 180 is able to display the information associated with the broadcast frequencies on the broadcast screen of the display module 151 to be discriminated according to one of priority, broadcast frequency and content/type/provider/etc. set by the user, manufacturer or retailer in advance.

For instance, the control unit 180 is able to display the informational to be discriminated according to one of the priority, broadcast frequency and content/type/provider/etc. in a manner of differentiating display brightness, display color and display size of the corresponding information according to the preset priority, broadcast frequency or content/type/provider/etc.

In case that the display module 151 is the touchscreen type, the control unit 180 is cable to modify display positions and display arrangements of the information according to user's touch.

The control unit 180 is able to display the information as one of a blanking type, an overlay type, an OSD (On Screen Display) type, and a semi-transparent type on the broadcast screen of the display module 151.

When the pay and free broadcast channels are displayed on the display module 151, if the pay broadcast channel is selected via the user input unit 130, the control unit 180 is able to purchase the pay broadcast channel by being connected to an external service network, which sells the pay broadcast channel, via the mobile communication module 112 or the wireless internet module 113.

Before displaying the pay and free broadcast channels on the display module 151, the control unit 180 analyzes a receive sensitivity of each of the pay and free broadcast channels.

The control unit 180 then displays the pay and free broadcast channels on the display module 151 in a manner that the pay and free broadcast channels can be discriminated according to the amount that the analyzed receive sensitivity of each of the pay and free broadcast channels is greater than a preset reference value. In a list type display, strongest signals may be displayed before weaker signals.

Figure 13:
FIG. 13 is a diagram for how to discriminate a display of pay and free broadcast channels according to an embodiment of the invention.

For instance, as seen in FIG. 13, the control unit 180 is able to display the pay and free broadcast channels to be discriminated according to receive sensitivity levels of the pay and free broadcast channels in a manner of differentiating display brightness, display color and display size of the pay and free broadcast channels according to the size.

If one information unit is selected via the manipulating unit 130 from the displayed extracted information for the broadcasts (S508), the control unit 180 controls the broadcast receiving module 111 to receive and play the broadcast frequency corresponding to the selected information unit (S509).

Figure 6:
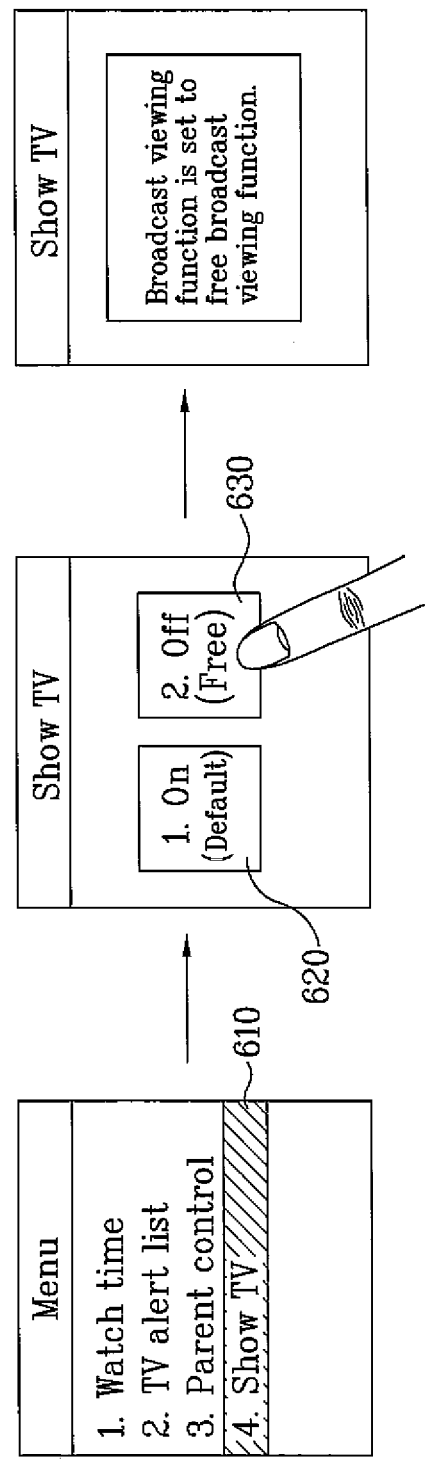
FIG. 6 is a diagram of a screen for a process for setting a default broadcast viewing function and a free broadcast viewing function according to one embodiment of the present invention.

FIG. 6 is a diagram of a screen for a process for setting a default broadcast viewing function and a free broadcast viewing function according to one embodiment of the present invention.

Referring to FIG. 6, if a user selects '3. Show TV' menu 610 for a default or free broadcast viewing function setting according to the present invention from a menu item, the control unit 180 displays a setting window 620 for setting the default broadcast viewing function and a setting window 630 for setting the free broadcast viewing function on the display module 151. In this case, the menu item can include a main menu or a broadcast menu of the terminal 100.

If the display module 151 is a touchscreen type, the user is able to set the default or free broadcast viewing function by touching the default broadcast viewing function setting window 620 or the free broadcast viewing function setting window 630 or by a key manipulation of the user input unit 130.

Figure 7:
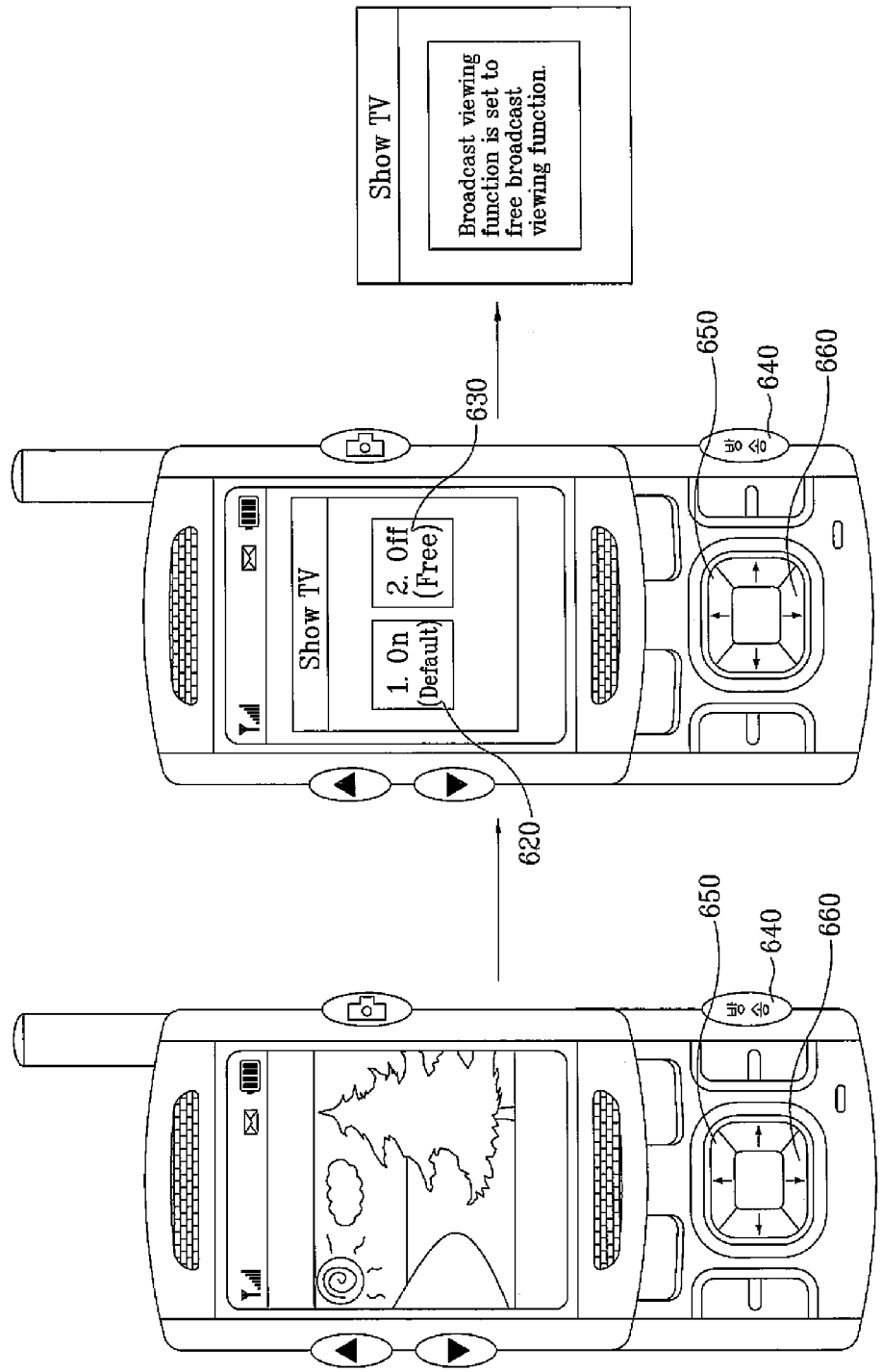
FIG. 7 is a diagram of a screen for a process for setting a default broadcast viewing function and a free broadcast viewing function according to another embodiment of the present invention.

FIG. 7 is a diagram of a screen for a process for setting a default broadcast viewing function and a free broadcast viewing function according to another embodiment of the present invention.

Referring to FIG. 7, unlike FIG. 6, it is able to set the default broadcast viewing function or the free broadcast viewing function using keys provided to one side of the body of the terminal 100.

For instance, if a user inputs a short-key or a long-key via a broadcast key 640 provided to one side of the body of the terminal 100 in a standby screen mode, the control unit is able to directly display the setting window 620 for setting the default broadcast viewing function and the setting window 630 for setting the free broadcast viewing function on the display module 151.

If a user inputs a long-key via a preset one of keys provided to the terminal 100, the control unit 180 is able to directly set the default broadcast viewing function or the free broadcast viewing function.

For instance, it is assumed that an upward key (↑) 650 and a downward key (↓) 660 of navigation keys provided to the terminal 100 are designated as a shortcut key for setting the default broadcast viewing function and a shortcut key for setting the free broadcast viewing function, respectively.

If a user inputs a long-key via the upward key (↑) 650 in the standby screen mode of FIG. 7, the control unit 180 directly sets the default broadcast viewing function.

If a user inputs a long-key via the downward key (↓) 660, the control unit 180 directly sets the free broadcast viewing function.

Figure 8:
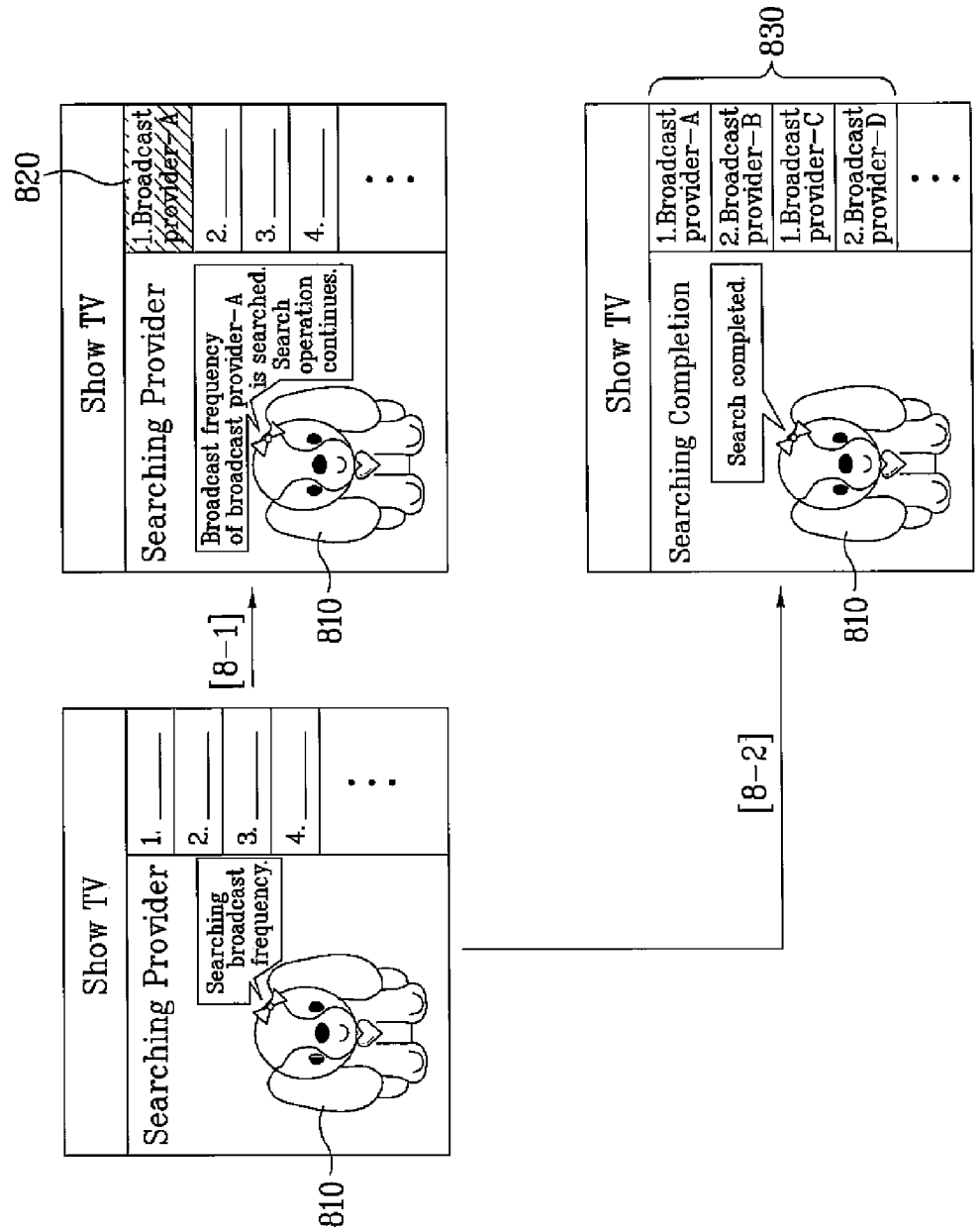
FIG. 8 is a diagram of a screen for a process for searching broadcasting frequencies of all broadcast providers in a current area in a free broadcast viewing function mode according to one embodiment of the present invention.

FIG. 8 is a diagram of a screen for a process for searching broadcasting frequencies of all broadcast providers in a current area in a free broadcast viewing function mode according to one embodiment of the present invention.

Referring to FIG. 8, if a broadcast menu is entered in a manner that a user manipulates the user input unit 130 in a mode that a free broadcast viewing function is set by the process shown in FIG. 6 or FIG. 7, the control unit 180 controls the broadcast receiving module 111 to search broadcast frequencies of entire broadcast providers in a current area.

In doing so, the control unit 180 is able to display information 810 such as a character image and the like to indicate the search operation status on the display unit 160.

Each time the corresponding broadcast frequency is searched after initiation of the search operation, the control unit 180 receives the ESG of the corresponding broadcast provider via the searched broadcast frequency and then displays information for the broadcast frequency in the received ESG on a broadcast skill of the display module 151 in turn [8-1].

In particular, after initiation of the search operation, as indicated by [8-1], if a broadcast frequency of a broadcast provider-A is searched, the ESG of the broadcast provider-A is received. Information 820 for the searched broadcast frequency in the received ESG is displayed. The search operation then keeps being performed.

After completion of the search operation, the control unit 180 receives ESGs of the broadcast providers via the searched broadcast frequencies and then displays the information for the searched broadcast frequencies in the received ESGs on the broadcast skill of the display module 151 [8-2].

In particular, after the broadcast frequencies of the entire broadcast providers in the current area have been searched, as indicated by [8-2], information 830 for the searched broadcast frequencies are displayed at a time on the broadcast skin of the display module 151.

Figure 9:
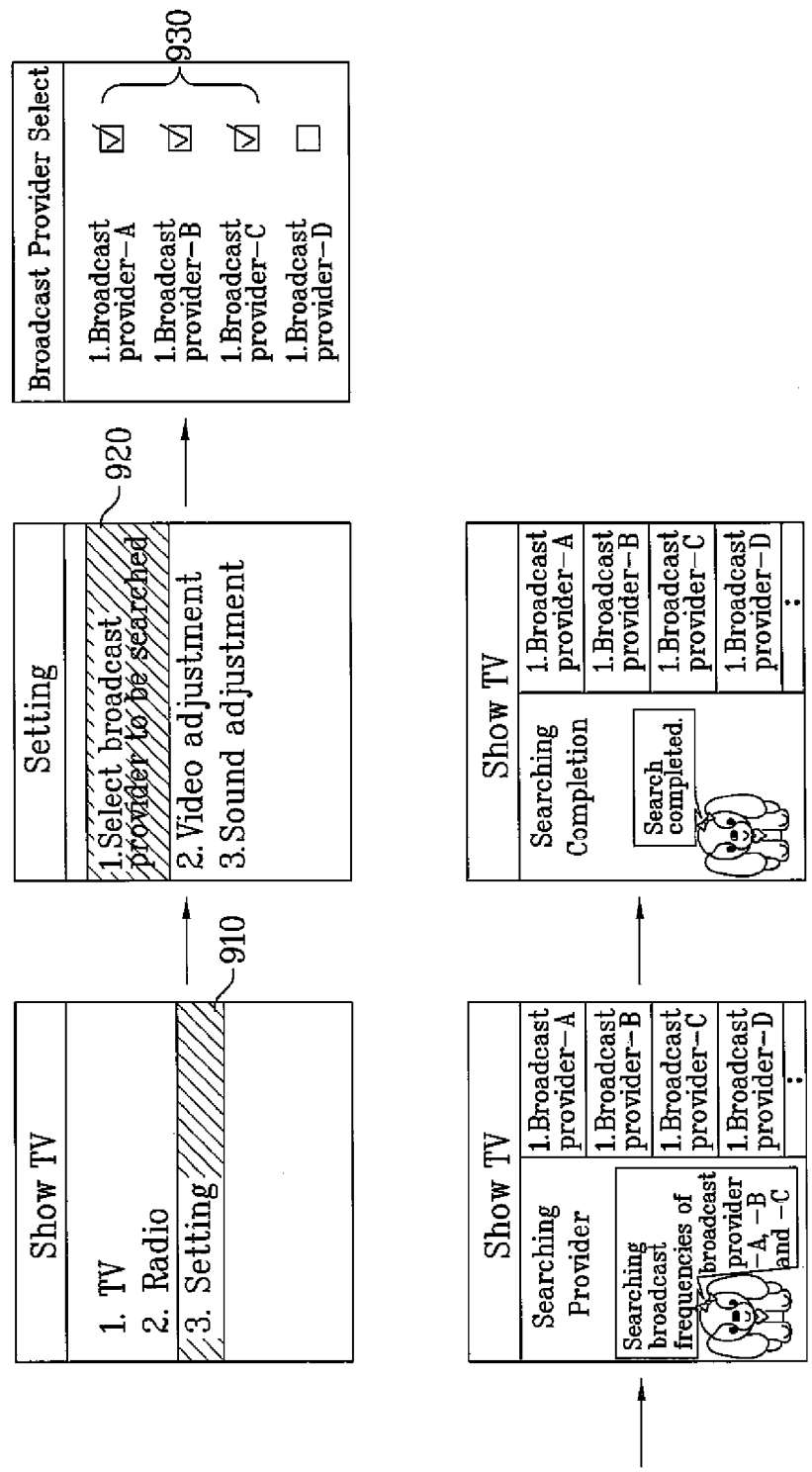
FIG. 9 is a diagram of a screen for a process for searching broadcasting frequencies of broadcast providers selected by a user in a current area in a free broadcast viewing function mode according to one embodiment of the present invention.

FIG. 9 is a diagram of a screen for a process for searching broadcasting frequencies of broadcast providers selected by a user in a current area in a free broadcast viewing function mode according to one embodiment of the present invention.

Referring to FIG. 9, after a menu 910 for broadcast environment setting has been entered in a manner that a user has manipulated the user input unit 130, the user selects a menu 920 for selecting a broadcast provider to be searched for. If so, the control unit 180 displays a user-selectable broadcast providers list on the display module 151.

In this case, the broadcast providers list can include a list of the broadcast providers searched in advance by the process shown in FIG. 8.

If broadcast providers 930 to be searched are selected from the broadcast providers list in a manner that the user manipulates the user input unit 130, the control unit 180 controls the broadcast receiving module 111 to search the broadcast frequencies of the broadcast providers 930 selected by the user.

Subsequently, the control unit 180 displays information for the searched broadcast frequencies on the broadcast skin of the display module 151 by the process indicated by [8-1] or [8-2] shown in FIG. 8.

Figure 10:
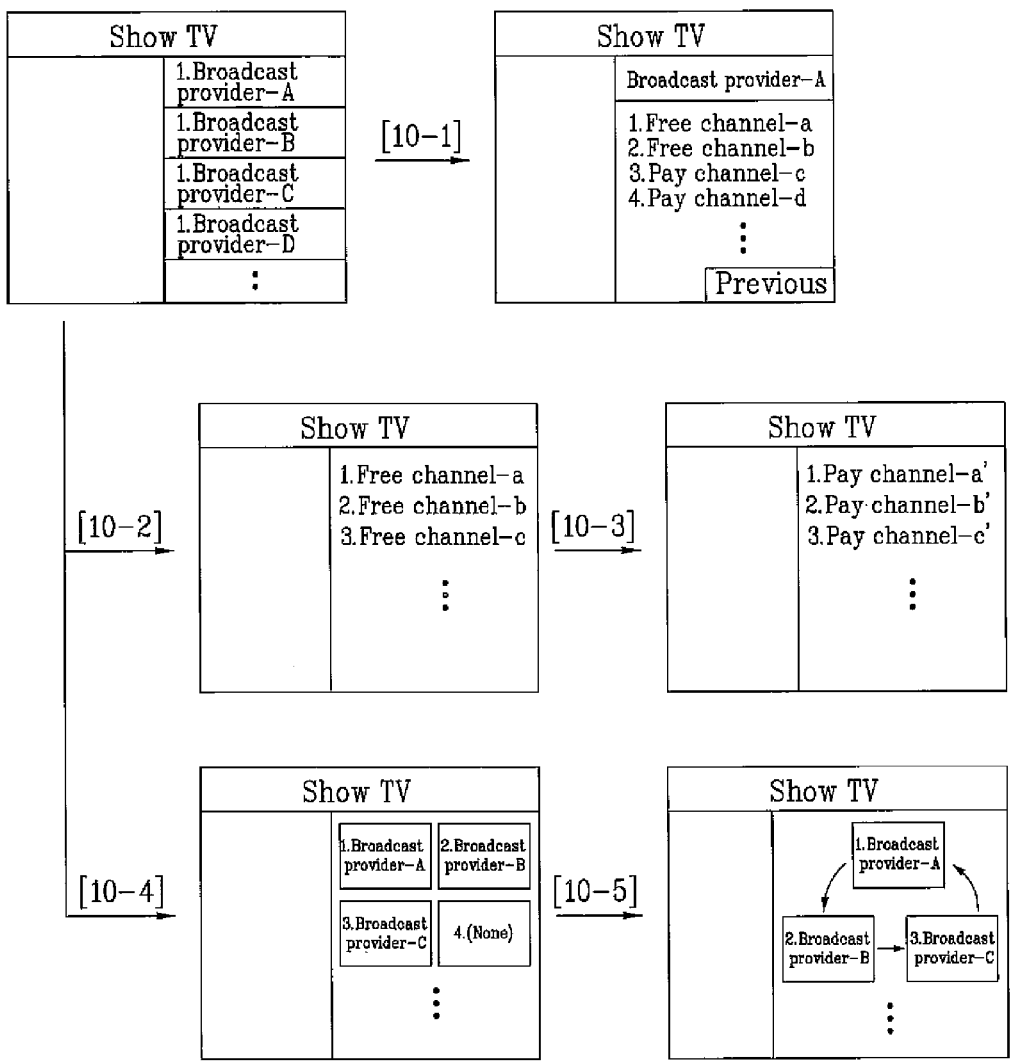
FIG. 10 is a diagram of a screen for a process for displaying information for searched broadcasting frequencies of broadcast providers in a free broadcast viewing function mode according to one embodiment of the present invention.

FIG. 10 is a diagram of a screen for a process for displaying information for searched broadcasting frequencies of broadcast providers in a free broadcast viewing function in ode according to one embodiment of the present invention;

Referring to FIG. 10, while information for broadcast frequencies of searched broadcast providers is displayed on the broadcast skin of the display module 151, if a user selects '1. Broadcast provider-A' 1010, the control unit 180 can display a pay/free broadcast channel list provided by the '1. Broadcast provider-A' 1010 on the broadcast skin of the display module 151 [10-1].

In particular, the control unit 180 receives ESG of the '1. Broadcast provider-A' via the broadcast frequency of the '1. Broadcast provider-A', extracts pay/free broadcast channels of the '1. Broadcast provider-A', and then displays the extracted pay/free broadcast channels.

The control unit 180 is able to display either the free broadcast channels of the '1. Broadcast provider-A' [10-2] or the pay broadcast channels of the '1. Broadcast provider-A' [10-3], according to a users setup.

In [10-1], [10-2] or [10-3], the control unit 180 displays the information for the searched broadcast frequencies as a list style. Yet, the control unit 180 is able to display the information as a grid style [10-4] or a rotational style [10-5] according to a user's setup.

The information for the broadcast frequencies can be displayed as one selected from the group consisting of blanking style, overlay style, OSD style, and semi-parent style (not shown in FIG. 10).

If one of the displayed information for the broadcast frequencies is selected by a user, the control unit 180 is able to receive and reproduce a broadcast signal via the broadcast frequency corresponding to the selected information (not shown in FIG. 10).

Figure 11:
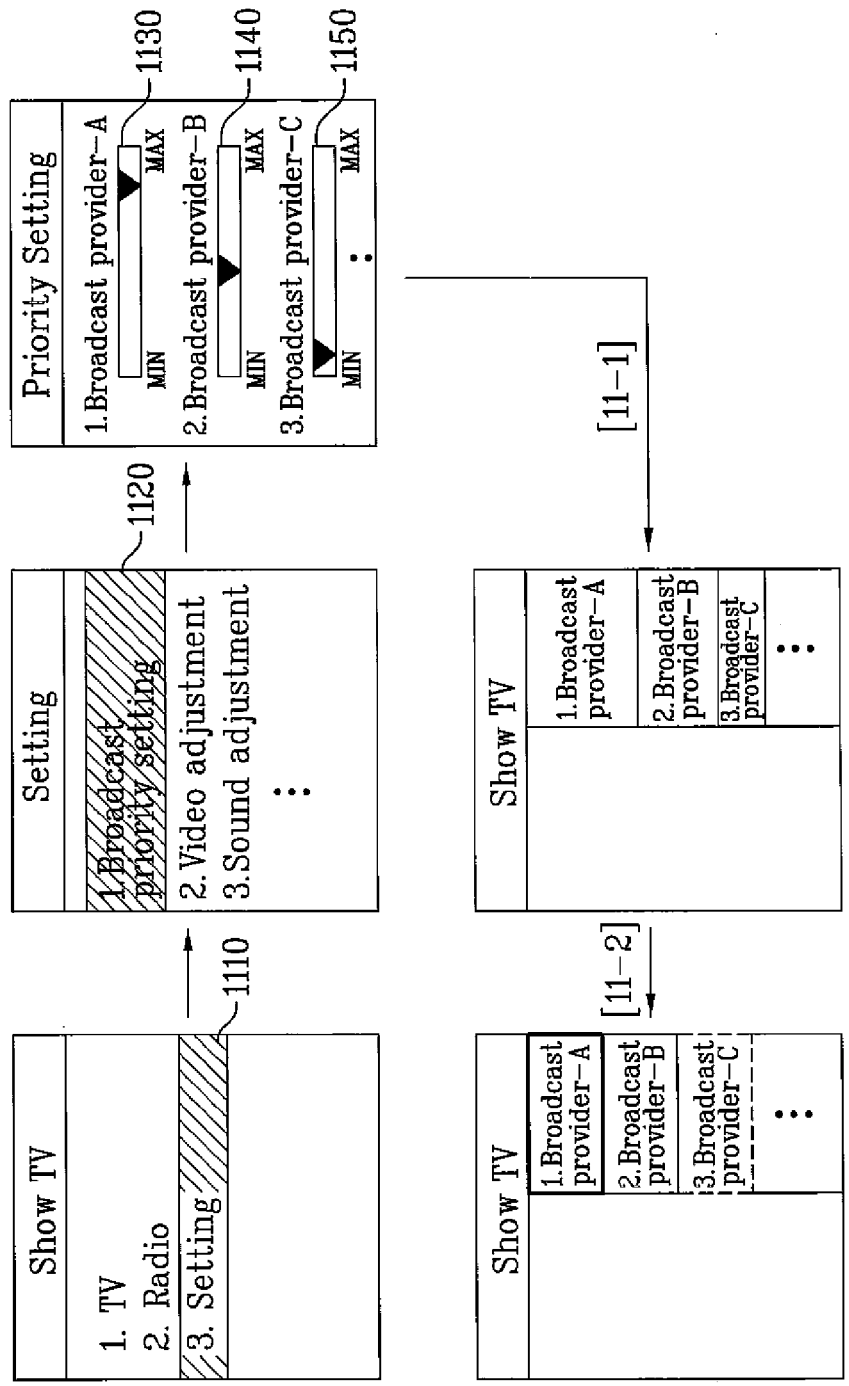
FIG. 11 is a diagram of a screen for a process for displaying information for searched broadcasting frequencies of broadcast providers in a free broadcast viewing function mode according to another embodiment of the present invention.

FIG. 11 is a diagram of a screen for a process for displaying information for searched broadcasting frequencies of broadcast providers in a free broadcast viewing function mode according to another embodiment of the present invention.

In particular, FIG. 11 depicts that the control unit 180 displays information for broadcast frequencies to be discriminated from each other according to one of priority, broadcast frequency and content/type/provider/etc. set by a user.

Assuming that a user sets the priority in FIG. 11, the control unit 180 performs a process for displaying information for broadcast frequencies as follows.

Referring to FIG. 11, after a menu 1110 for setting a broadcast environment has been entered in a manner that a user has manipulate the user input unit 130, a user selects a priority setting menu 1120. If so, the control unit 180 displays a broadcast providers list on the display module 151 so that the user can set a priority.

The user manipulates the user input unit 130 to set priorities of '1. Broadcast provider-A' 1130, '2. Broadcast provider-B' 1140 and '3. Broadcast provider-C' 1150 to 'highest', 'medium', and 'lowest', respectively.

If so, the control unit 180 is able to display the '1. Broadcast provider-A' 1130, '2. Broadcast provider-B' 1140 and '3. Broadcast provider-C' 1150 in a manner of changing their display sizes to correspond to the above-set priorities [11-1].

Alternatively, the control unit 180 is able to display the '1. Broadcast provider-A' 1130, '2. Broadcast provider-B' 1140 and '3. Broadcast provider-C' 1150 in a manner of changing their display brightness to correspond to the above-set priorities [11-2].

Alternatively, the control unit 180 is able to display the '1. Broadcast provider-A' 1130, '2. Broadcast provider-B' 1140 and '3. Broadcast provider-C' 1150 in a manner of changing their display colors to correspond to the above-set priorities [11-3] (not shown in FIG. 11).

If one of the displayed information for the broadcast frequencies is selected by the user, the control unit 180 is able to receive and reproduce a broadcast signal via the broadcast frequency corresponding to the selected information (not shown in FIG. 11).

Figure 12:
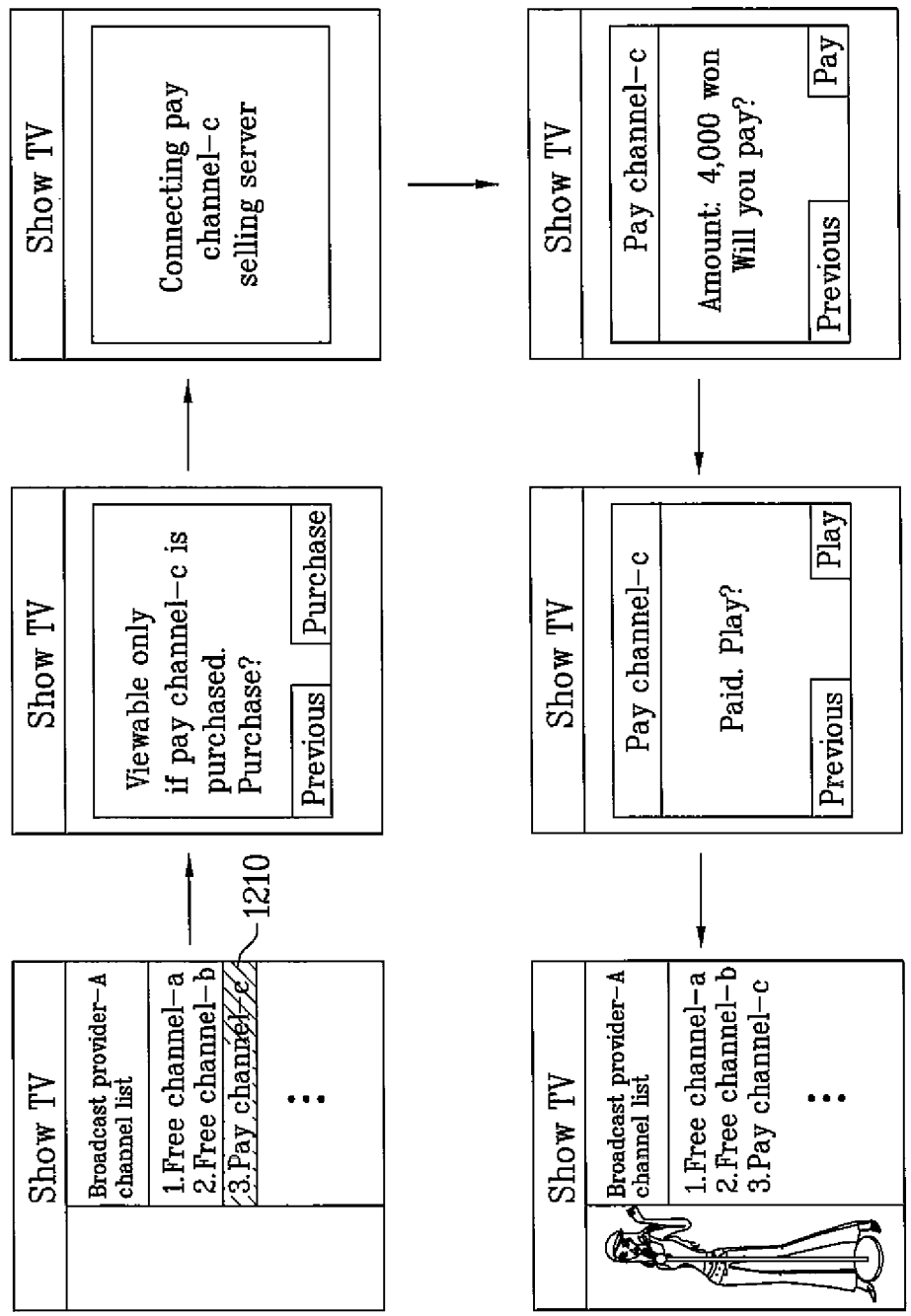
FIG. 12 is a diagram of a screen for a process for purchasing pay broadcast channels of searched broadcast providers in a free broadcast viewing function mode according to one embodiment of the present invention.

FIG. 12 is a diagram of a screen for a process for purchasing pay broadcast channels of searched broadcast providers in a free broadcast viewing function mode according to one embodiment of the present invention.

Referring to FIG. 12, while a pay/free broadcast channel list of 'Broadcast provider-A' is displayed, if a user selects '3. Pay broadcast channel-c' 1210, the control unit 180 displays a window for inquiring the user whether to purchase the '3. Pay broadcast channel-c' 1210 on the display module 151.

If a key signal for purchasing the '3. Pay broadcast channel-c' 1210 is inputted via the window, the control unit 180 controls the mobile communication module 112 or the wireless internet module 113 to be connected to an external server for selling the '3. Pay broadcast channel-c' 1210.

After completion of authentication by the external server, the control unit 180 displays a window for payment of the '3. Pay broadcast channel-c' 1210 oil the display module 151.

If a key signal for paying the '3. Pay broadcast channel-c' 1210 is inputted via the payment window, the control unit 180 notifies the selling server of the payment completion and then plays the '3. Pay broadcast channel-c' 1210.

Accordingly, the present invention is able to deactivate a function of receiving a broadcast provided by a first broadcast provider only, thereby enabling a user to receive and view broadcasts provided by various broadcast providers using a single SIM card.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing plural broadcasts in a terminal, the method comprising:
   detecting, by the terminal, whether a subscriber identity module (SIM) card is installed in the terminal,
   wherein the SIM card is set with a default function, the default function for receiving only a default broadcast provided by a default broadcast provider, the default broadcast including one or more free or paid broadcast channels;
   upon detecting that the SIM card is installed, displaying, by the terminal, a setting window for selecting one of the default function and another function for receiving another broadcast;
   if the default function is selected, receiving, by the terminal, the default broadcast provided by the default broadcast provider set in the SIM card; and displaying, by the terminal, a first icon for indicating an execution status of the default function for receiving the default broadcast; and if the another function is selected, deactivating, by the terminal, the default function set in the SIM card;

displaying, by the terminal, a second icon for indicating an execution status of the another function for receiving the another broadcast;

detecting, via a search by the terminal, at least one broadcast provided by at least one broadcast provider in a current area of the terminal;

receiving, by the terminal, broadcast program guide information for the at least one broadcast provider detected via the search;

extracting, by the terminal, information for at least one free broadcast channel from the received broadcast program guide information;

analyzing, by the terminal, a receiving sensitivity of the at least one free broadcast channel; and displaying, by the terminal, a free broadcast channel list including the extracted information according to the analyzed receiving sensitivity, wherein the free broadcast channel list includes a channel name of the free broadcast channel.

2. The method of claim 1, wherein the selecting one of the default function and the another function comprises:
receiving a selection command from a user.

3. The method of claim 1, wherein the search comprises:
searching a predetermined broadcast frequency band.

4. The method of claim 3, further comprising:
selecting the at least one broadcast from a predetermined set of broadcasts prior to searching the predetermined broadcast frequency band.

5. The method of claim 1, further comprising:
displaying one of a broadcast name and a broadcast channel name of the detected at least one broadcast.

6. The method of claim 5, wherein the detected at least one broadcast is a pay broadcast, the method further comprising:
displaying a screen enabling a payment of a corresponding pay broadcast access fee.

7. The method of claim 1, wherein the at least one broadcast provided by the at least one broadcast provider comprises at least two broadcasts, the method further comprising:
displaying information about the at least two detected broadcasts in an order corresponding to one of a selectable priority, a selectable broadcast frequency and a selectable broadcast content, type or provider.

8. The method of claim 1, wherein the at least one broadcast provided by the at least one broadcast provider comprises at least two broadcasts the method further comprising:
displaying the at least two detected broadcasts in order of received signal strength.

9. The method of claim 1, further comprising:
playing the at least one broadcast.

10. The method of claim 1, wherein the step of displaying the free broadcast channel list comprises:
enlarging the channel name of the free broadcast channel according to the analyzed receiving sensitivity.

11. A terminal, comprising:
a user input unit;
a display unit;
an interface unit configured to receive a subscriber identity module (SIM) card, the SIM card being set with a default function, the default function for receiving only a default broadcast provided by a default broadcast provider, the default broadcast including one or more free or paid broadcast channels;

a communication unit configured to receive broadcasts; and a control unit operatively connected to the user input unit, the display unit, the interface unit and the communication unit, the control unit configured to detect whether the SIM card is installed in the interface unit, and upon detecting that the SIM card is installed, display a setting window for selecting one of the default function and another function for receiving another broadcast, if the default function is selected,
receive the default broadcast provided by the default broadcast provider set in the SIM card,
display a first icon for indicating an execution status of the execution of the default function for receiving the default broadcast, if the another function is selected,
deactivate the default function set in the SIM card,
display a second icon for indicating an execution status of the another function for receiving the another broadcast,
detect, via a search, at least one broadcast of at least one broadcast provider in a current area of the terminal,
receive broadcast program guide information for the at least one broadcast provider detected via the search,
extract information for at least one free broadcast channel from the received broadcast program guide information,
analyze a receiving sensitivity of the at least one free broadcast channel, and
control the display unit to display a free broadcast channel list including the extracted information according to the analyzed receiving sensitivity, wherein the information extracted for the at least one free broadcast channel includes a channel name of the at least one free broadcast channel.

12. The terminal of claim 11, wherein the one of the default function and the another function is selected according to a key input from the user input unit.

13. The terminal of claim 11, wherein the search comprises a search of a predetermined frequency band.

14. The terminal of claim 13, wherein the at least one broadcast is selected from a predetermined set of broadcasts prior to searching the predetermined broadcast frequency band.

15. The terminal of claim 11, wherein the control unit is configured to display one of a detected broadcast name and a detected broadcast channel name of the detected at least one broadcast.

16. The terminal of claim 15, wherein, if the detected at least one broadcast is a pay broadcast, the control unit is configured to display a screen enabling a payment of a corresponding pay broadcast access fee.

17. The terminal of claim 11,
wherein the at least one broadcast provided by the at least one broadcast provider comprises at least two broadcasts, and
wherein the control unit is configured to display information about the at least two detected broadcasts in an order corresponding to one of a selectable priority, a selectable broadcast frequency and a selectable broadcast content, type or provider.

18. The terminal of claim 11,
wherein the at least one broadcast provided by the at least one broadcast provider comprises at least two broadcasts, and
wherein the control unit is configured to display the at least two detected broadcasts in order of received signal strength.

19. The terminal of claim 11, wherein the control unit is configured to play the at least one broadcast.

20. The terminal of claim 11, wherein the control unit is configured to enlarge the channel name of the free broadcast channel according to the analyzed receiving sensitivity.

* * * * *